United States Patent
Massow et al.

(10) Patent No.: US 11,993,410 B2
(45) Date of Patent: *May 28, 2024

(54) PACKAGED VISCOELASTIC POLYMER SUBSTANCE

(71) Applicant: tesa SE, Norderstedt (DE)

(72) Inventors: Klaus Massow, Hamburg (DE); Volker Lass, Bargteheide (DE); Kay Brandes, Otter (DE)

(73) Assignee: TESA SE, Norderstedt (DE)

( * ) Notice: Subject to any disclaimer, the term of this patent is extended or adjusted under 35 U.S.C. 154(b) by 580 days.

This patent is subject to a terminal disclaimer.

(21) Appl. No.: 17/293,651

(22) PCT Filed: Nov. 13, 2019

(86) PCT No.: PCT/EP2019/081138
§ 371 (c)(1),
(2) Date: May 13, 2021

(87) PCT Pub. No.: WO2020/099467
PCT Pub. Date: May 22, 2020

(65) Prior Publication Data
US 2022/0010079 A1   Jan. 13, 2022

(30) Foreign Application Priority Data
Nov. 13, 2018  (DE) .................... 10 2018 219 357.6

(51) Int. Cl.
| | |
|---|---|
| B65B 29/00 | (2006.01) |
| B29C 48/00 | (2019.01) |
| B29C 48/28 | (2019.01) |
| B29C 48/88 | (2019.01) |
| B65B 9/20 | (2012.01) |
| B65B 61/24 | (2006.01) |
| B65B 63/08 | (2006.01) |
| B65D 65/38 | (2006.01) |
| C08J 3/18 | (2006.01) |
| C09J 7/24 | (2018.01) |
| C09J 133/08 | (2006.01) |
| C09J 133/10 | (2006.01) |
| B29K 33/00 | (2006.01) |
| B29K 105/00 | (2006.01) |

(52) U.S. Cl.
CPC .......... B65B 29/00 (2013.01); B29C 48/0011 (2019.02); B29C 48/0019 (2019.02); B29C 48/28 (2019.02); B29C 48/919 (2019.02); B65B 9/20 (2013.01); B65B 61/24 (2013.01); B65B 63/08 (2013.01); B65D 65/38 (2013.01); C08J 3/18 (2013.01); C09J 7/24 (2018.01); *C09J 133/08* (2013.01); *C09J 133/10* (2013.01); *B29K 2033/08* (2013.01); *B29K 2105/0097* (2013.01); *C08J 2333/08* (2013.01); *C08J 2333/10* (2013.01); *C08J 2423/06* (2013.01); *C08J 2423/08* (2013.01); *C08J 2423/12* (2013.01)

(58) Field of Classification Search
CPC ......... B65B 63/08; B65B 29/00; B65B 61/24; B65B 9/20; B29K 2033/08; B29K 2105/0097; C09J 7/385; C09J 7/243; C09J 7/245; B65D 65/38
See application file for complete search history.

(56) References Cited

U.S. PATENT DOCUMENTS

| | | |
|---|---|---|
| 5,257,491 A | 11/1993 | Rouyer et al. |
| 5,373,682 A | 12/1994 | Hatfield et al. |
| 5,669,207 A | 9/1997 | Hull |
| 5,804,610 A * | 9/1998 | Hamer ................. C09J 4/00 |
| | | 522/182 |
| RE36,177 E | 4/1999 | Rouyer et al. |
| 2013/0196108 A1 | 8/2013 | Hinc et al. |
| 2014/0356562 A1 | 12/2014 | Remmers et al. |
| 2020/0307880 A1* | 10/2020 | Kiyohara ............... C09J 7/245 |

FOREIGN PATENT DOCUMENTS

| | | | |
|---|---|---|---|
| DE | 32 34 065 A1 | 4/1983 | |
| DE | 91 16 662 U | 5/1993 | |
| DE | 696 06 039 T2 | 6/2000 | |
| EP | 3 004 272 B1 | 4/2016 | |
| FR | 2 762 308 A1 | 10/1998 | |
| FR | 2762308 A1 * | 10/1998 | ......... B29C 47/0016 |
| WO | WO-9607522 A1 * | 3/1996 | ........... B29B 13/022 |
| WO | 01/46019 A1 | 6/2001 | |

OTHER PUBLICATIONS

International Search Report dated Feb. 3, 2020, in connection with PCT International Application No. PCT/EP2019/081138.
English translation of International Search Report dated Feb. 3, 2020, in connection with PCT International Application No. PCT/EP2019/081138.
Written Opinion issued in connection with PCT International Application No. PCT/EP2019/081138.

\* cited by examiner

*Primary Examiner* — Atul P. Khare
(74) *Attorney, Agent, or Firm* — Norris McLaughlin, P.A.

(57) ABSTRACT

Packaged viscoelastic polymer substances and methods for the production of the packaged viscoelastic polymer substances are provided. The packaged viscoelastic polymer substances are further processable under the influence of heat and shear.

14 Claims, No Drawings

PACKAGED VISCOELASTIC POLYMER SUBSTANCE

This application is a 371 of PCT/EP2019/081138, filed Nov. 13, 2019, which claims foreign priority benefit under 35 U.S.C. § 119 of the German Patent Application No. 10 2018 219 357.6, filed Nov. 13, 2018, the disclosures of which are incorporated herein by reference.

The present invention relates to a method for producing a packaged viscoelastic polymer substance. The present invention further relates to a packaged viscoelastic polymer substance which is obtainable by the method described herein, and also to the use of the packaged viscoelastic polymer substance for further processing under the influence of heat and shear.

Viscoelastic polymer substances are known and are frequently used for producing adhesive compositions. Such adhesive compositions comprise, for example, polyacrylate polymers, which are often prepared in solution via polymerization processes. Where the polymerization of such base polymers takes place in a solvent, the polymer is concentrated after polymer preparation, by removal of the solvent. Subsequently the polymer is admixed with further constituents which are needed to produce the adhesive composition. According to the adhesive properties to be formulated, there may be great variation both in the properties of the base polymer and in the individual constituents of the completed adhesive composition. In order to make the further processing of such polymer substances as flexible as possible and to provide for storage, for example, of relatively large amounts of base polymer, adhesive composition precursor or else the adhesive composition itself, it is necessary for such polymer substances to be packaged.

There is therefore a need for the provision of viscoelastic polymer substances in storable form which as and when required can be made available for further processing, including in industrial processes.

EP 3004272 B1 is dedicated to providing packaged adhesives in various forms, such as pillows, and describes packaged pressure-sensitive hotmelt adhesives comprising a pressure-sensitive hotmelt adhesive composition and a coextrusion coating consisting of pure polyethylene, pure polypropylene or pure ethylene-vinyl acetate with a specific melt flow index. According to the prior art, a self-adhesive polymer substance can be produced by the coextrusion of adhesive and protective polymer, after which the enveloped polymer is singularized into portions. To date, however, it has not been possible reliably to envelop viscoelastic polymers with high molecular weights, suitable for producing self-adhesive compositions, with a protective polymer of this kind. On the one hand, the processing temperatures required for the purpose resulted in destruction of the protective polymer; on the other hand, there is an increased internal pressure within the viscoelastic polymer during the singularization step, this pressure dissipating during the subsequent storage time and leading to opening of the protective polymer envelope at the seams. The result is unwanted emergence of the viscoelastic polymer.

It would be possible to counter this risk by means of larger amounts of protective polymer. In order to minimize the effect on the properties of the viscoelastic polymers, however, the fraction of nonadhesive protective polymer ought to be as small as possible. Smaller fractions of protective polymer result in the susceptibility described with respect to external mechanical and thermal loads. The task is therefore to find a balanced trade-off between protective effect and influence on the properties of the pressure-sensitive hotmelt adhesive.

Viscoelastic polymers with high molecular weights require high processing temperatures to bring them into a fluid state. High processing temperatures harbor the risk of the nonadhesive protective polymer melting or being damaged in such a way that the viscoelastic polymer emerges and further processing is no longer possible. Because the protective polymers are not removed on remelting, but instead are brought together with the viscoelastic polymer into a plastified form, it is not possible to use protective polymers having relatively high softening or melting points, since either this would result in a possibly unallowably high further-processing temperature, or residues of unmelted protective polymer would remain in the viscoelastic adhesive matrix. Both possibilities could have unwanted consequences for the subsequent use as a self-adhesive composition.

Particularly for large amounts of packaged adhesives and adhesive precursors, which are difficult to package at room temperature and even at elevated temperatures still have high viscosities of 100 Pas or more, however, there continues to be a need for improvement. In particular there has so far been a lack of suitable methods which permit simple and efficient production of large amounts of packaged viscoelastic polymer substances. A key problem here is that the polymer substances, for packaging, have to be heated and plastified. Because large amounts of the polymer substances store more heat than small amounts of polymer substance, a limiting factor in the large-scale production of packaged polymer substances to date has been the removal of the thermal energy previously inserted into the polymer substances for better processing. In other words, the energy with which the polymer substances were heated before packaging for better plastifying has to be removed again.

From this it can be deduced that in the case of large amounts of packaged viscoelastic polymer substances, a compromise was required. This compromise consisted of a long time for the cooling of large amounts of polymer substance. Or it was necessary to produce a large number of individual packs whose contents could be quickly cooled. This approach presents problems, however, since particularly in the case of large numbers of small individual packs, there is a risk of the protective envelope of a few small packs opening, with the consequent possibility of blocking and sticking to other small packs.

There continues, therefore, to be a need for efficient and rapid methods for providing large amounts of packaged viscoelastic polymer substances. In particular there is a need for efficient and rapid methods for providing large amounts of packaged base polymers which consist substantially of poly(meth)acrylates and can be used as pressure-sensitive hotmelt adhesives. Such base polymers are first prepared in solvents, preferably by the process of free radical polymerization, and are subsequently freed from the solvents in a concentration process under the influence of heat and vacuum. If the base polymers thus prepared are still not suitable as self-adhesive pressure-sensitive hotmelt adhesives, these base polymers are blended in one or more downstream steps with further additives such as tackifying resins, fillers, plasticizers, crosslinkers, etc. This so-called compounding of the base polymers takes place preferably continuously in twin-screw extruders or else in planetary roller extruders.

A further need is that for the provision of a method which enables the viscoelastic polymer substances, especially the base polymers, to be able to be processed at locations including those where there are no facilities for their polymerization or concentration. The task was therefore to find a procedure allowing the viscoelastic base polymers to be transported and blended at the intended location to form pressure-sensitive hotmelt adhesive compositions.

One known and frequently utilized approach for the storage and for the transport of meltable polymers, such as hotmelt adhesives, for example, involves dispensing them into smooth-wall drums, in which the polymers, after their storage and their transport, are first heated by means of so-called drum melts so as to increase the fluidity of the polymer substance, before the polymer substance is supplied to the further operation. This form of deposition is possible only with extremely costly and inconvenient conditions in the case of viscoelastic base polymers of high viscosity, since the high viscosities mean that only low melt flow rates are achieved, so making the production process uneconomic.

Against this background, the problem addressed by the present invention is that of providing a method for producing a packaged viscoelastic polymer substance which is transportable and storable in large quantities, where the method can be managed with reduced time, and the sticking and blocking of individual packs is avoided.

The present invention solves this problem by means of a method for producing a packaged viscoelastic polymer substance, which comprises the following steps:
  a) providing and plastifying a viscoelastic polymer substance at elevated temperatures, the polymer substance being a polymer substance based on poly(meth)acrylates having a weight-average molecular weight of 500 000 g/mol or more;
  b) continuously dispensing the plastified viscoelastic polymer substance into a protective polymer film, which has no self-adhesive properties and which before being filled with the viscoelastic polymer substance has been brought into a tubular form, to give a strandlike polymer assembly having a diameter of 55 to 70 mm, comprising a core of the plastified viscoelastic polymer substance and a shell of the protective polymer film, where the fraction of the protective polymer film, based on the total weight of protective polymer film and viscoelastic polymer substance, is less than 1.0 wt %, and where the plastified viscoelastic polymer substance has a viscosity of more than 100 Pas at the instant of being dispensed into the tubular protective polymer film;
  c) converting the strandlike polymer assembly into a flattened strandlike polymer assembly whose smallest cross section has a ratio of width to height of about 2:1 to 7:1, preferably of about 3:1 to 5:1;
  d) cooling the flattened strandlike polymer assembly to a temperature at which the polymer assembly is still plastically deformable;
  e) and subsequently winding the flattened strandlike polymer assembly onto a reel, where the strandlike polymer assembly wound onto the reel has a length of more than 30 meters, preferably a length of more than 50 meters, and more preferably a length of more than 100 meters.

In the method of the invention, then, before entry into the cooling bath, the assembly of viscoelastic polymer and protective polymer is flattened, preferably by means of rolls, in order to achieve more rapid cooling of the viscoelastic polymer and hence a thermal preservation of the protective polymer.

The present invention additionally relates to packaged viscoelastic polymer substances which are obtainable by the method described herein, and also to the use and the deployment of the packaged viscoelastic polymer substance as described herein in a further processing operation. In one preferred embodiment of this use, the viscoelastic base polymer clad with a protective polymer is brought into a plastified state for further processing and is heated to a temperature at which the protective polymer melts and is incorporated homogeneously into the viscoelastic base polymer.

In step a) of the method described herein, a viscoelastic polymer substance is provided and is plastified at elevated temperatures, before the plastified polymer substance is dispensed continuously into a protective polymer film. The viscoelastic polymer substance is a polymer substance based on poly(meth)acrylate having a weight-average molecular weight of 500 000 g/mol or more, and possesses a viscosity of more than 100 Pas at the instant of being dispensed into the tubular protective polymer film.

"Plastifying" in the sense of the present invention refers to the attainment of a state in which the viscoelastic polymer substance is deformable, preferably fluid. At the elevated temperatures used for plastifying, the polymer substance here has a better deformability, in other words an increased fluidity, than is the case in the event of unelevated temperatures. The plastifying of the viscoelastic polymer substance is carried out preferably at elevated temperatures in an extruder.

Furthermore, at the instant of being dispensed into the tubular form, the viscoelastic polymer substance has a viscosity of more than 100 Pas. The viscosity is determined using an ARES rheometer from Rheometric Scientific Incorporation (air-mounted) (geometry type=parallel plates; diameter=25.0 [mm]; test type=rate sweep; temperature=100; 120; 140; 160; 180[° C.]; sweep mode=log; initial rate=0.1 [l/s]; final rate=100.0 [l/s]; points per decade=[6]).

In step b) of the method described herein, the plastified viscoelastic polymer substance from step a) is dispensed continuously into a protective polymer film. The protective polymer film consists of a protective polymer which has no self-adhesive properties. Before being filled, the protective polymer film is brought into a tubular form. The tubular protective polymer film is therefore not obtained by a coextrusion process; instead, starting from a conventional film, a tubular form is produced. This is possible, for example, by starting from a sheetlike film and joining two opposite side edges of the film to one another in such a way as to produce a tube. The side edges may be joined by means of heat introduction and pressure.

In step b), the dispensing of the viscoelastic polymer substance into the tubular protective polymer film gives a strandlike polymer assembly, which comprises a core of the plastified viscoelastic polymer substance and a shell of the protective polymer. The fraction of the protective polymer in the invention, based on the total weight of protective polymer and viscoelastic polymer substance, is less than 1.0 percent by weight. In the steps a) and b) described herein, then, a strandlike polymer assembly is produced. This strandlike polymer assembly has a diameter of about 55 to 70 mm, preferably 60 to 70 mm, with the diameter initially being circular because of the tubular form of protective polymer film which is filled in step b).

In step c) the strandlike polymer assembly is then brought into a flattened strandlike polymer assembly, whose smallest cross section has a ratio of width to height of about 2:1 to 7:1, preferably of about 3:1 to 5:1. The expression "smallest cross section" in this context means that measurement is made in a plane perpendicular to the longitudinal axis of the strandlike polymer assembly. In other words, rather than the measurement being based on a cross section along the longest extent of the polymer strand, a determination is made of the deviation from the initially circular cross-sectional form of the strandlike polymer assembly from step b). The smallest cross section and the ratio of width to height are an expression of the extent of the flattening. The flattening can be achieved by guiding the strandlike polymer assembly through a nip or rolls, examples being rotating rolls. In one preferred embodiment of the present invention, the flattening takes place by means of rolls.

The converting of the strandlike polymer assembly into a correspondingly flattened strandlike polymer assembly greatly improves heat exchange between the strandlike polymer assembly and its surroundings, and so step d), i.e., the cooling of the strandlike polymer assembly, can be carried out significantly more rapidly (in comparison to an unflattened, substantially circular cross-sectional form). In step d) the flattened strandlike polymer assembly obtained in step c) is cooled to a temperature at which the poly assembly is still plastically deformable. The strandlike polymer assembly can be cooled by passing it, for example, through a water bath, which is used as a cooling section. At the end of step d), the core temperature of the flattened strandlike polymer assembly is preferably less than 100 degrees Celsius, preferably less than 90 degrees C., more preferably less than 80 degrees C. The concept of the core temperature is understood in the present invention to be the temperature in the cross-sectional middle of the strandlike polymer assembly.

In step e) of the method described herein, the strandlike polymer assembly is subsequently wound onto a reel, where the strandlike polymer assembly wound onto the reel has a length (in the unwound state) of more than 30 meters, preferably more than 50 meters, and more preferably more than 100 meters.

In one particularly preferred method according to the present invention, the strandlike polymer assembly obtained in step d) is first introduced at the start of step e) through an opening in the end face of the reel and secured there. This ensures that in the region of the end initially wound onto the reel, the strandlike polymer assembly does not slip and there is no emergence of polymer substance from the protective polymer envelope.

Particularly advantageous embodiments of the method of the invention described herein use a viscoelastic polymer substance which on conversion into the strandlike form has a viscosity of more than 250 Pas, preferably a viscosity of more than 500 Pas.

The protective polymer film used in the invention preferably comprises polyethylene, polypropylene, ethylene-vinyl acetate or a mixture thereof. The fraction of the protective polymer film used in step b), based on the total weight of protective polymer and viscoelastic polymer substance, is more preferably less than 0.8 percent by weight, more preferably still less than 0.5 percent by weight, based on the total weight of protective polymer and viscoelastic polymer substance. Particularly suitable fractions of the protective polymer, based on the total weight of protective polymer and viscoelastic polymer substance, are situated in the range from 0.05 to 1, preferably in the range from 0.1 to 0.8, more preferably in the range between 0.2 and 0.5, as for example in a range from 0.25 to 0.45 percent by weight.

In a further preferred embodiment of the present invention, the viscoelastic polymer substance is an adhesive composition (or a precursor thereof), preferably a pressure-sensitive adhesive composition (or a precursor thereof). The present invention understands the term "precursor" to mean that the viscoelastic polymer substance can be used for producing an adhesive composition. The viscoelastic polymer substance packaged by the method of the invention is especially preferably a precursor of an adhesive composition, ideally a base polymer. More particularly, for the purposes of the present invention, a precursor of an adhesive composition means preferably the precursor of a pressure-sensitive adhesive composition. Such a precursor may be the polymer which is present at the end of the polymerization of the polymers that are used as base polymers for the viscoelastic polymer substance. Likewise embraced by the concept of the precursor of a pressure-sensitive adhesive composition are mixtures which are obtained after the addition of various additives or components to the base polymer. The concept of the pressure-sensitive adhesive composition as used herein is synonymous with the concept of the self-adhesive composition or the concept of the pressure-sensitive adhesive.

A pressure-sensitive adhesive (PSA) or pressure-sensitive adhesive composition is understood in the invention, and customarily in the general usage, as a material which at least at room temperature is permanently tacky and also adhesive. A characteristic of a PSA is that it can be applied by pressure to a substrate and remains adhering there, with no further definition of the pressure to be applied and the period of exposure to this pressure. In general, though in principle dependent on the precise nature of the PSA and also of the substrate, and on the temperature and the atmospheric humidity, exposure to a minimal pressure of short duration, which does not go beyond gentle contact for a brief moment, is enough to achieve the adhesion effect, while in other cases a longer-term period of exposure to a higher pressure may also be necessary.

Viscoelastic polymer substances in the sense of the present invention are polymer substances based on poly(meth)acrylates having a weight-average molecular weight of 500 000 g/mol.

A "poly(meth)acrylate" is a polymer which is obtainable by radical polymerization of acrylic and/or methacrylic monomers and also, optionally, further, copolymerizable monomers. More particularly a "poly(meth)acrylate" is a polymer whose monomer basis consists to an extent of at least 50 wt % of acrylic acid, methacrylic acid, acrylic esters and/or methacrylic esters, with acrylic esters and/or methacrylic esters being included at least fractionally, preferably to an extent of at least 30 wt %, based on the overall monomer basis of the polymer in question.

The viscoelastic polymer substance described herein is preferably a pressure-sensitive adhesive composition or a precursor thereof, with the pressure-sensitive adhesive composition comprising poly(meth)acrylate preferably at 40 to 70 wt % in total, more preferably at 45 to 60 wt % in total, based in each case on the total weight of the pressure-sensitive adhesive composition. One (single) poly(meth)acrylate or a plurality of poly(meth)acrylates may be present.

The glass transition temperature of the poly(meth)acrylate of the pressure-sensitive adhesive composition described is preferably <0° C., more preferably between −20 and −50° C. The glass transition temperature of polymers or of polymer blocks in block copolymers is determined in the invention by means of dynamic scanning calorimetry (DSC). For this purpose, around 5 mg of an untreated polymer sample are weighed out into an aluminum crucible (volume 25 µl) and closed with a perforated lid. Measurement takes place using a DSC 204 F1 from Netzsch. Operation takes place under nitrogen for inertization. The sample is initially cooled to −150° C., then heated to +150° C. at a heating rate of 10 K/min, and again cooled to −150° C. The subsequent, second heating curve is run again at 10 K/min, and the change in the heat capacity is recorded. Glass transitions are recognized as steps in the thermogram.

The poly(meth)acrylate of the pressure-sensitive adhesive composition described herein preferably comprises at least one fractionally copolymerized functional monomer, more preferably a monomer reactive with epoxide groups to form a covalent bond. Very preferably the fractionally copolymerized functional monomer, more preferably the monomer reactive with epoxide groups to form a covalent bond, contains at least one functional group selected from the group consisting of carboxylic acid groups, sulfonic acid groups, phosphonic acid groups, hydroxyl groups, acid anhydride groups, epoxide groups, and amino groups; more particularly it comprises at least one carboxylic acid group. Very preferably the poly(meth)acrylate of the pressure-sensitive adhesive composition described herein comprises fractionally copolymerized acrylic acid and/or methacrylic acid. All of the stated groups have a reactivity with epoxide groups, so making the poly(meth)acrylate advantageously amenable to thermal crosslinking with introduced epoxides.

The poly(meth)acrylate of the pressure-sensitive adhesive composition described herein may preferably be derived from the following monomer composition:

a) at least one acrylic ester and/or methacrylic ester of the following formula (1)

CH$_2$=C(R$^I$)(COOR$^{II}$)                (1), in which R$^I$=H or CH$_3$ and R$^{II}$ is an alkyl radical having 4 to 18 carbon atoms;

b) at least one olefinically unsaturated monomer having at least one functional group selected from the group consisting of carboxylic acid groups, sulfonic acid groups, phosphonic acid groups, hydroxyl groups, acid anhydride groups, epoxide groups, and amino groups;

c) optionally further acrylic esters and/or methacrylic esters and/or olefinically unsaturated monomers which are copolymerizable with component (a).

It is particularly advantageous to select the monomers of component a) with a fraction of 45 to 99 wt %, the monomers of component b) with a fraction of 1 to 15 wt %, and the monomers of component c) with a fraction of 0 to 40 wt %, the figures being based on the monomer mixture for the base polymer without additions of possible additives such as resins, etc.

The monomers of component a) are generally plasticizing, relatively nonpolar monomers. More preferably R$^{II}$ in the monomers a) is an alkyl radical having 4 to 10 carbon atoms or 2-propylheptyl acrylate or 2-propylheptyl methacrylate. The monomers of the formula (1) are selected more particularly from the group consisting of n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate, isobutyl acrylate, isooctyl acrylate, isooctyl methacrylate, 2-ethylhexyl acrylate, 2-ethylhexyl methacrylate, 2-propylheptyl acrylate and 2-propylheptyl methacrylate.

The monomers of component b) are more preferably selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, especially 2-hydroxyethyl acrylate, hydroxypropyl acrylate, especially 3-hydroxypropyl acrylate, hydroxybutyl acrylate, especially 4-hydroxybutyl acrylate, hydroxyhexyl acrylate, especially 6-hydroxyhexyl acrylate, hydroxyethyl methacrylate, especially 2-hydroxyethyl methacrylate, hydroxypropyl methacrylate, especially 3-hydroxypropyl methacrylate, hydroxybutyl methacrylate, especially 4-hydroxybutyl methacrylate, hydroxyhexyl methacrylate, especially 6-hydroxyhexyl methacrylate, allyl alcohol, glycidyl acrylate, glycidyl methacrylate.

Illustrative monomers of component c) are:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, methyl 3-methoxy acrylate, 3-methoxybutyl acrylate, 2-phenoxyethyl methacrylate, butyl diglycol methacrylate, ethylene glycol acrylate, ethylene glycol monomethyl acrylate, methoxypolyethylene glycol methacrylate 350, methoxypolyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide; N,N-dialkyl-substituted amides such as, for example, N,N-dimethylacrylamide and N,N-dimethylmethacrylamide; N-benzylacrylamide, N-isopropylacrylamide, N-tert-butylacrylamide, N-tert-octylacrylamide, N-methylolacrylamide, N-methylolmethacrylamide, acrylonitrile, methacrylonitrile; vinyl ethers such as vinyl methyl ether, ethyl vinyl ether, vinyl isobutyl ether; vinyl esters such as vinyl acetate; vinyl halides, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene; macromonomers such as 2-polystyreneethyl methacrylate (weight-average molecular weight Mw, determined by GPC, of 4000 to 13 000 g/mol), poly(methyl methacrylate)ethyl methacrylate (Mw of 2000 to 8000 g/mol).

Monomers of component c) may advantageously also be selected such that they contain functional groups which support subsequent radiation-chemical crosslinking (for example, by electron beams, UV). Suitable copolymerizable photo initiators are, for example, benzoin acrylate and acrylate-functionalized benzophenone derivatives. Monomers which support crosslinking by electron beam bombardment are, for example, tetrahydrofurfuryl acrylate, N-tert-butylacrylamide and allyl acrylate.

The poly(meth)acrylates are prepared preferably by conventional radical polymerizations or controlled radical polymerizations. The poly(meth)acrylates may be prepared by copolymerizing the monomers using customary polymerization initiators and also, optionally, chain transfer agents, with polymerization taking place at the customary temperatures in bulk, in emulsion, for example in water or liquid hydrocarbons, or in solution.

The poly(meth)acrylates are preferably prepared by copolymerization of the monomers in solvents, more preferably in solvents having a boiling range of 50 to 150° C., more particularly of 60 to 120° C., using from 0.01 to 5 wt % of polymerization initiators, more particularly from 0.1 to 2 wt % of polymerization initiators, based in each case on the total weight of the monomers. All customary initiators are suitable in principle. Examples of radical sources are peroxides, hydroperoxides and azo compounds, as for example dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, and benzopinacol. Preferred radical initiators are 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Preferred solvents for preparing the poly(meth)acrylates are alcohols such as methanol, ethanol, n- and isopropanol, n- and isobutanol, especially isopropanol and/or isobutanol; hydrocarbons such as toluene and, in particular, mineral spirits with a boiling range from 60 to 120° C.; ketones, especially acetone, methyl ethyl ketone, methyl isobutyl ketone; esters such as ethyl acetate; and mixtures of the aforementioned solvents. Particularly preferred solvents are mixtures containing isopropanol in amounts of 2 to 15 wt %, more particularly of 3 to 10 wt %, based in each case on the solvent mixture employed.

When solvent is used, after the preparation of the poly(meth)acrylates (i.e., at the end of the polymerization), there is a concentration process, and the polymer thus produced is employed in substantially solvent-free form as a viscoelastic polymer substance in the method of the invention.

The concentration of the polymer may take place in the absence of further additives such as crosslinker and accelerator substances. It is also possible, however, for one of these classes of compound to be added to the polymer even before concentration, in which case the concentration takes place in the presence of said substance(s). This only makes sense, however, if the presence of the selected additives does not go against the method of the present invention, since in the invention a viscoelastic polymer substance is first provided and is plastified at elevated temperatures (step a)), before the plastified viscoelastic polymer substance based on the poly(meth)acrylate is filled into a protective polymer film (step b)). In the invention, therefore, no additives are added to the respective steps of the method unless the additives are compatible with the temperatures of the individual method steps.

In the invention the weight-average molecular weights Mw of the poly(meth)acrylates are 500 000 g/mol or more, preferably 750 000 g/mol or more, more preferably 1 000 000 g/mol or more. To this end, it may be advantageous to carry out the polymerization in the presence of suitable polymerization chain transfer agents such as thiols, halogen compounds and/or alcohols, in order to establish the desired average molecular weight.

The figures for the weight-average molecular weights, Mw (and likewise for the number-average molecular weight, Mn) in this text are based on the conventional determination by gel permeation chromatography (GPC). The determination is made on a 100 μl sample which has undergone clarifying filtration (sample concentration 4 g/l). The eluent used is tetrahydrofuran with 0.1 vol % of trifluoroacetic acid. The measurement is made at 25° C.

The pre-column used is a PSS-SDV column, 5 μm, $10^3$ Å, 8.0 mm*50 mm (details here and below are in the following order: type, particle size, porosity, internal diameter*length; 1 Å=$10^{-10}$ m). Separation takes place using a combination of the PSS-SDV columns, 5 μm, $10^3$ Å and also $10^5$ Å and $10^6$ Å, each with 8.0 mm*300 mm (columns from Polymer Standards Service; detection using Shodex R171 differential refractometer). The flow rate is 1.0 ml per minute. Calibration takes place against PMMA standards (polymethyl methacrylate calibration) in the case of poly(meth)acrylates, and otherwise (resins, elastomers) against PS standards (polystyrene calibration).

In the invention the viscoelastic polymer substance based on poly(meth)acrylates is a polymer substance which comprises one or more poly(meth)acrylates or consists of one or more poly(meth)acrylates. Particularly preferred embodiments of the invention relate to methods in which the viscoelastic polymer substance is a self-adhesive composition or can be converted into a self-adhesive composition.

The term "can be converted" is understood by the present invention to refer, for example, to situations in which the viscoelastic polymer substance can be converted into the actual pressure-sensitive adhesive composition through modification, e.g., by crosslinking, and/or by addition of additives. Depending on the degree of crosslinking required, the viscoelastic polymer substance may be provided already in the form of a crosslinked poly(meth)acrylate, or the concluding crosslinking for establishing the desired degree of crosslinking is carried out only when the packaged viscoelastic polymer substance is employed in the use described herein for further processing under the influence of heat and shear.

Where the demand is for pressure-sensitive adhesive compositions with a relatively low molecular weight and good shear strength after the crosslinking step, the poly(meth)acrylate of the polymer substances described herein may have a polydispersity of, for example, PD<4 and hence a relatively narrow molecular weight distribution. Moreover, the lower polydispersity enables easier processing from the melt, since the flow viscosity is lower than that of a more broadly distributed poly(meth)acrylate with largely the same performance properties. Narrowly distributed poly(meth)acrylates may be prepared advantageously by anionic polymerization or by controlled radical polymerization techniques, the latter being especially suitable. Such poly(meth)acrylates may also be prepared via N-oxyls. Additionally, in an advantageous way, it is possible to employ atom transfer radical polymerization (ATRP) in order to synthesize narrowly distributed poly(meth)acrylates, in which case the initiator used preferably comprises monofunctional or difunctional, secondary or tertiary halides, with abstraction of the halides being carried out using complexes of Cu, Ni, Fe, Pd, Pt, Ru, Os, Rh, Co, Ir, Ag or Au. RAFT polymerization is also suitable.

The poly(meth)acrylates of the pressure-sensitive adhesive composition described herein are crosslinked preferably by linking reactions—especially in the sense of addition or substitution reactions—of functional groups they contain with thermal crosslinkers. It is possible to use all thermal crosslinkers which both ensure a sufficiently long working time, so that there is no gelling during the processing operation, especially the extrusion procedure, and lead to rapid postcrosslinking of the polymer to the desired degree of crosslinking at temperatures lower than the processing temperature, more particularly at room temperature.

Possible, for example, is a combination of polymers containing carboxyl, amino and/or hydroxyl groups, and as crosslinker isocyanates, especially aliphatic or blocked isocyanates, examples being trimerized isocyanates deactivated with amines. Suitable isocyanates are, in particular, trimerized derivatives of MDI [4,4-methylenedi(phenyl isocyanate)], HDI [hexamethylene diisocyanate, 1,6-hexylene diisocyanate], and IPDI [isophorone diisocyanate, 5-isocyanato-1-isocyanatomethyl-1,3,3-trimethylcyclohexane], examples being the products Desmodur® N3600 and XP2410 (each from BAYER AG: aliphatic polyisocyanates, low-viscosity HDI trimers). Likewise suitable is the surface-deactivated dispersion of micronized, trimerized IPDI BUEJ 3390, now HF9® (BAYER AG).

Preference is given to using thermal crosslinkers at 0.1 to 5 wt %, more particularly at 0.2 to 1 wt %, based on the total amount of the polymer to be crosslinked.

Also possible is crosslinking via complexing agents, also referred to as chelates. An example of a preferred complexing agent is aluminum acetylacetonate.

The pressure-sensitive adhesive composition described herein preferably comprises at least one tackifier—which may also be referred to as peel adhesion booster or tackifying resin—which is compatible with the poly(meth)acrylate. A "tackifier", in line with the general understanding of the skilled person, is an oligomeric or polymeric resin which raises the autohesion (the tack, the intrinsic stickiness) of the pressure-sensitive adhesive composition in comparison to the otherwise identical pressure-sensitive adhesive composition containing no tackifier.

A "tackifier compatible with the poly(meth)acrylate" refers to a tackifier which, by comparison with the pure poly(meth)acrylate, changes the glass transition temperature of the system obtained after thorough mixing of poly(meth) acrylate and tackifier, where the mixture of poly(meth) acrylate and tackifier can also be assigned only one Tg. In the system obtained after thorough mixing of poly(meth) acrylate and tackifier, a tackifier not compatible with the poly(meth)acrylate would lead to two Tgs, one assignable to the poly(meth)acrylate and the other to the resin domains. The determination of the Tg in this context takes place calorimetrically by means of DSC (differential scanning calorimetry).

The tackifier compatible with the poly(meth)acrylate preferably has a DACP of less than 0° C., very preferably of at most −20° C., and/or preferably a MMAP of less than 40° C., very preferably of at most 20° C. For the determination of DACP and MMAP values, reference is made to C. Donker, PSTC Annual Technical Seminar, Proceedings, pp. 149-164, May 2001.

The tackifier compatible with the poly(meth)acrylate is more preferably a terpene-phenolic resin or a rosin derivative, more particularly a terpene-phenolic resin. The pressure-sensitive adhesive composition described herein may also comprise mixtures of two or more tackifiers. Among the rosin derivatives, rosin esters are preferred.

A pressure-sensitive adhesive composition as described herein preferably comprises tackifiers compatible with the poly(meth)acrylate at 7 to 25 wt % in total, more preferably at 12 to 20 wt % in total, based in each case on the total weight of the pressure-sensitive adhesive composition.

Depending on the field of application and desired properties of the pressure-sensitive adhesive composition described, it may comprise further components and/or additives, in each case alone or in combination with one or more other additives or components.

For example, the pressure-sensitive adhesive composition described herein may comprise pulverulent and granular, including, in particular, abrasive and reinforcing, fillers, dyes and pigments such as titanium dioxide, zinc oxides and/or carbon blacks, for example. Furthermore, there may be various organic fillers present.

The density of the viscoelastic polymer substance is preferably 1.05 to 1.3 g/cm$^3$, more preferably 1.10 to 1.25 g/cm$^3$, measured at 25 degrees Celsius.

As described above, the invention first provides a viscoelastic polymer substance (step a)) and fills it continuously into a tubular protective polymer film (step b)), before the resultant strandlike polymer assembly is flattened (step c)) and subsequently cooled (step d)). For the winding of the flattened strandlike polymer assembly onto a reel (step e)), any desired reel suitable for accommodating a strandlike polymer assembly of corresponding length may be used.

The winding of the strandlike polymer assembly onto a reel ensures that sufficiently large amounts of viscoelastic polymer substance can be held ready in a transportable and storable form.

In one preferred embodiment of the present invention, the method described herein is carried out continuously. This means that steps a) to e) are carried out in such a way that after step d), i.e., after the cooling, the polymer assembly is directly wound onto a reel. For this purpose one end of the strandlike polymer assembly can first be passed through an opening in the end face of the reel and secured there, before the winding procedure proper begins. As soon as a sufficient length of the strandlike polymer assembly (that is, at least 30 m, preferably 50 m or more, more preferably 100 m or more) has been wound onto the reel, the end of the strandlike polymer assembly is sealed and, if required, secured on the reel. To seal the strandlike polymer assembly, the protective polymer may be adhesively bonded or welded at its end, for example, such as by heating sections of the protective polymer and subsequently pressing them against one another, in the manner known for a heat sealing process, for example.

The viscoelastic polymer substance thus produced is a subject of the present invention and is suitable for use and further processing under the influence of heat and shear.

The present invention thus provides a method with which large amounts of completed polymer substance can be site-independently stored, transported, and further processed. For this purpose, for example, the packaged viscoelastic polymer substance may be unwound from the reel and introduced continuously into an extruder. In this extruder, the packaged viscoelastic polymer substance is then plastified under the influence of heat and shear, and preferably melted, so that ideally the protective polymer is present uniformly distributed in the viscoelastic polymer substance. The resulting mixture of viscoelastic polymer substance and protective polymer may then be portioned and/or shaped, or the mixture of viscoelastic polymer substance and protective polymer is admixed with further additives.

The specified quantities, sizes and other dimensions described herein, such as the amount of the protective polymer fraction and the dimensions of the flattened strandlike polymer assembly, for example, permit simple provision of large amounts of transportably and storably packaged viscoelastic polymer substance; the method can be managed with reduced time, and sticking and blocking of individual packs is avoided. At the same time the further processing of the packaged viscoelastic polymer substance under the influence of heat and shear to form an intermediate or end product is ensured. For further processing together with the protective polymer, the viscoelastic polymer substance is advantageously treated in an extruder under the influence of heat and shear.

It has emerged that the continuous dispensing of the viscoelastic polymer substance into a protective polymer film as described herein furnishes a stable strandlike polymer assembly which is storable over temperature ranges of −30° C. to +60° C. without any emergence of the viscoelastic polymer substance. This distinguishes the packaged viscoelastic polymer substance of the invention from pillow-shaped packaged product, where again and again there is unwanted opening of the individual packets. Furthermore, the use of the protective polymer in the amounts described herein ensures that in the further processing, under the influence of heat and shear, the protective polymer melts and can be distributed homogeneously in the viscoelastic polymer substance.

The invention claimed is:

1. A method for producing a packaged viscoelastic polymer substance, the method comprising:
   a) plastifying a viscoelastic polymer substance at elevated temperatures, the viscoelastic polymer substance being a polymer substance based on poly(meth)acrylates having a weight-average molecular weight of 500,000 g/mol or more;
   b) continuously dispensing the plastified viscoelastic polymer substance into a protective polymer film, the protective polymer film having no self-adhesive properties and having been brought into a tubular form before said continuous dispensing so as to be filled with the plastified viscoelastic polymer substance, thereby forming a strandlike polymer assembly having a diameter of 55 to 70 mm, a core of the plastified viscoelastic polymer substance, and a shell of the protective polymer film, wherein a fraction of the protective polymer film, based on a total weight of the protective polymer film and the plastified viscoelastic polymer substance, is less than 1.0 wt %, and wherein the plastified viscoelastic polymer substance has a viscosity of more than 100 Pas during said continuous dispensing into the tubular protective polymer film;
   c) converting the strandlike polymer assembly into a flattened strandlike polymer assembly with a smallest cross-section having a ratio of width to height of about 2:1 to 7:1;
   d) cooling the flattened strandlike polymer assembly to a temperature at which the strandlike polymer assembly is still plastically deformable; and
   e) subsequently winding the cooled flattened strandlike polymer assembly onto a reel, wherein the strandlike polymer assembly wound onto the reel has a length of more than 30 meters.

2. The method of claim 1, wherein the converting of the strandlike polymer assembly into the flattened strandlike polymer assembly in step c) is carried out by means of rolls.

3. The method of claim 1, wherein the cooling in step d) is carried out down to a core temperature of less than 100° C.

4. The method of claim 1, wherein the strandlike polymer assembly in step e) is first passed through an opening in the end face of the reel and secured to the reel.

5. The method of claim 1, wherein step d) takes place in a water bath.

6. The method of claim 1, wherein the plastifying in step a) is carried out in an extruder.

7. The method of claim 1, wherein the plastified viscoelastic polymer substance has a viscosity of more than 250 Pas during said continuous dispensing into the tubular protective polymer film.

8. The method of claim 1, wherein the fraction of the protective polymer film in step b), based on the total weight of protective polymer film and plastified viscoelastic polymer substance, is less than 0.5 wt %.

9. The method of claim 1, wherein the protective polymer film consists of polyethylene, polypropylene, ethylene-vinyl acetate, or a mixture thereof.

10. The method of claim 1, wherein the viscoelastic polymer substance is a self-adhesive composition or is convertible into a self-adhesive composition.

11. The method of claim 1, wherein the viscoelastic polymer substance has a density at 25° C. of 1.05 to 1.3 g/cm$^3$.

12. A method comprising:
    plastifying the packaged viscoelastic polymer substance formed according to claim 1 under the influence of heat and shear.

13. The method of claim 12, further comprising:
    treating the packaged viscoelastic polymer substance with said heat and shear such that the protective polymer film is plastified.

14. The method of claim 13, wherein the treatment with heat and shear is carried out in an extruder.

* * * * *